United States Patent
Kitahara et al.

(10) Patent No.: US 6,704,056 B2
(45) Date of Patent: Mar. 9, 2004

(54) HORIZONTAL DEFLECTION CIRCUIT AND TELEVISION RECEIVER

(75) Inventors: Toshiaki Kitahara, Ibaraki (JP);
Hideyo Uwabata, Takatsuki (JP);
Yutaka Nishikawa, Kobe (JP);
Chikara Gotanda, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 470 days.

(21) Appl. No.: 09/861,587

(22) Filed: May 22, 2001

(65) Prior Publication Data

US 2001/0048480 A1 Dec. 6, 2001

(30) Foreign Application Priority Data

May 23, 2000 (JP) ......................... 2000-151020

(51) Int. Cl.[7] .............................. H04N 5/10; H04N 7/01; H04N 3/223
(52) U.S. Cl. ................. 348/458; 348/531; 348/704; 315/364; 315/367; 315/368.13
(58) Field of Search ................. 348/441, 443, 348/458, 531, 704; 315/364, 368.13, 367, 370; H04N 7/01, 5/10, 3/223

(56) References Cited

U.S. PATENT DOCUMENTS

| 4,760,455 A | * | 7/1988 | Nagashima | 348/556 |
| 5,534,934 A | * | 7/1996 | Katsumata et al. | 348/445 |
| 5,550,442 A | * | 8/1996 | Ueyama et al. | 315/371 |
| 5,793,433 A | * | 8/1998 | Kim et al. | 348/445 |
| 5,812,210 A | * | 9/1998 | Arai et al. | 348/555 |
| 5,903,315 A | * | 5/1999 | Itoh et al. | 348/564 |
| 6,097,437 A | * | 8/2000 | Hwang | 348/441 |
| 6,262,779 B1 | | 7/2001 | Sugiyama et al. | |
| 6,285,402 B1 | * | 9/2001 | Miyazaki et al. | 348/445 |
| 6,534,920 B1 | * | 3/2003 | Uwabata et al. | 315/1 |

FOREIGN PATENT DOCUMENTS

| JP | 9-322011 | 12/1997 |
| JP | 11-234591 | 8/1999 |

* cited by examiner

*Primary Examiner*—John Miller
*Assistant Examiner*—Brian Yenke
(74) *Attorney, Agent, or Firm*—Armstrong, Kratz, Quintos, Hanson & Brooks, LLP

(57) ABSTRACT

A video signal conversion part of a horizontal deflection circuit deletes a prescribed number of horizontal scanning lines from a vertical blanking interval of an input video signal and assigns a time corresponding to the deleted horizontal scanning lines to horizontal blanking intervals of the remaining horizontal scanning lines thereby extending the horizontal blanking interval of each horizontal scanning line and outputting a video signal. A synchronizing signal separation circuit extracts a horizontal synchronizing signal and a vertical synchronizing signal from the video signal output from the video signal conversion part. An output part of the horizontal deflection circuit supplies a sawtooth horizontal deflection current to a horizontal deflection yoke in synchronization with the horizontal synchronizing signal output from the synchronizing signal separation circuit.

20 Claims, 8 Drawing Sheets

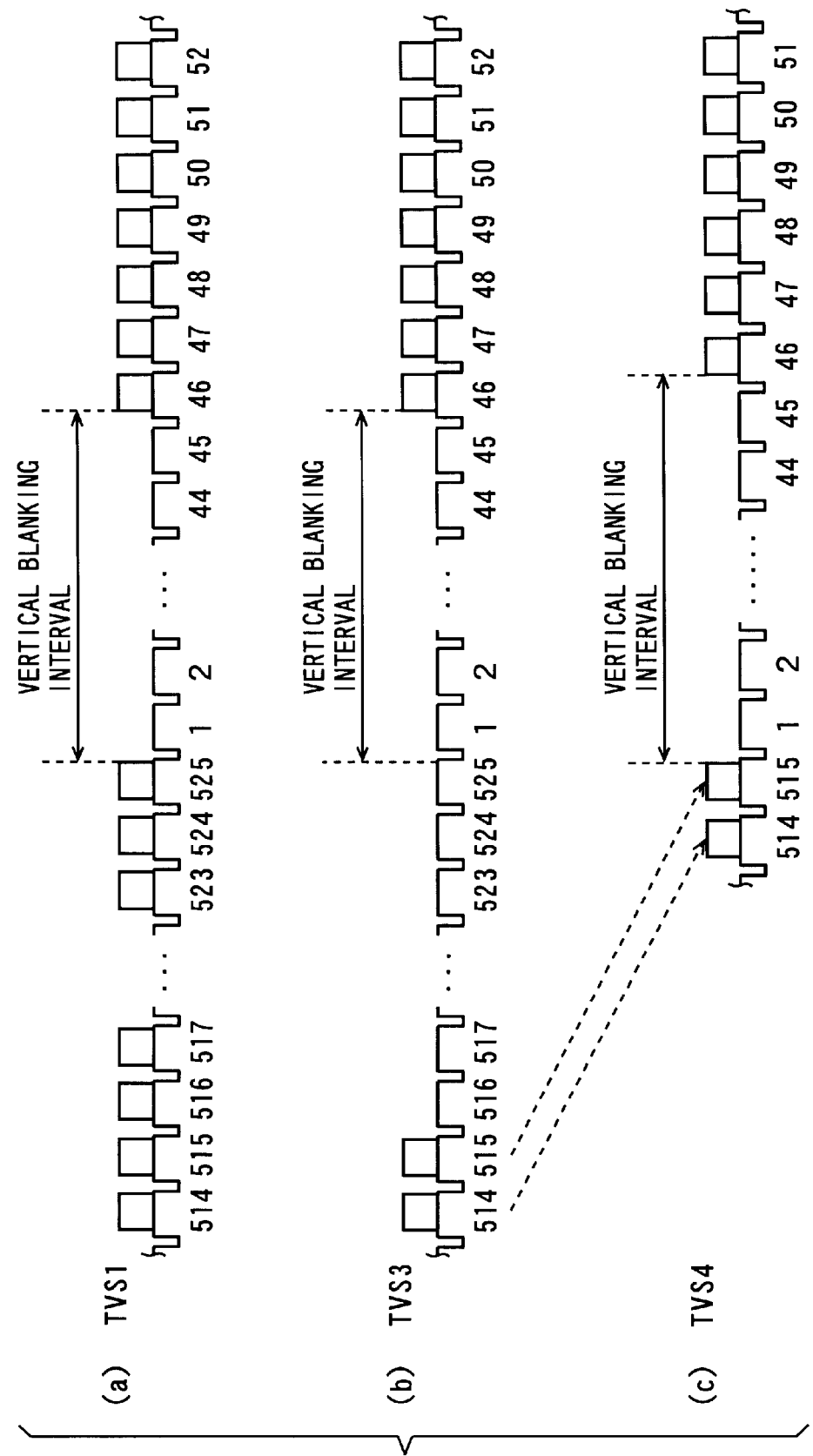

HORIZONTAL DEFLECTION CIRCUIT AND TELEVISION RECEIVER

BACKGROUND OF THE INVENTION

1. Field of the Invention

The present invention relates to a horizontal deflection circuit and a television receiver comprising the same.

2. Description of the Prior Art

Recently, a television receiver tends to have a large screen. Further, the number of horizontal scanning lines forming a single screen tends to increase in order to improve picture quality. In addition, the television receiver is required to be capable of displaying a video signal such as a high-definition signal having a high horizontal scanning frequency.

The CRT (cathode ray tube) of the television receiver is provided with a horizontal deflection yoke and a vertical deflection yoke in order to deflect an electron beam, while a horizontal deflection circuit supplies a horizontal deflection current to the horizontal deflection yoke for horizontally scanning the electron beam and a vertical deflection circuit supplies a vertical deflection current to the vertical deflection coil for vertically scanning the electron beam.

Power consumption of the television receiver is increased following the aforementioned increase of the screen size and the number of the horizontal scanning lines, and hence reduction of power consumption is necessary. Particularly the horizontal deflection circuit consumes high power, and hence power consumption of the horizontal deflection circuit must be reduced.

In the horizontal deflection circuit, switching loss of the horizontal deflection current occupies most part of power consumption. In order to reduce power consumption of the horizontal deflection circuit, therefore, a power supply voltage for the horizontal deflection circuit may be increased for reducing the horizontal deflection current.

The horizontal deflection circuit has a transistor (hereinafter referred to as a horizontal output transistor) for supplying the horizontal deflection current to the horizontal deflection yoke. When the horizontal output transistor is switched, a large pulse voltage is generated on the collector in a horizontal blanking interval. This pulse voltage is applied across the collector and the emitter of the horizontal output transistor, and hence the withstand voltage across the collector and the emitter of the horizontal output transistor must be increased beyond the peak of the pulse voltage.

When the power supply voltage for the horizontal deflection circuit is increased for reducing the horizontal deflection current, therefore, the pulse voltage generated on the collector of the horizontal output transistor is increased. Therefore, the withstand voltage of the horizontal output transistor must be increased, to result in a high cost.

Accordingly, awaited is a technique of reducing the power consumption of the horizontal deflection circuit without increasing the withstand voltage of the horizontal output transistor.

SUMMARY OF THE INVENTION

An object of the present invention is to provide a horizontal deflection circuit reduced in power consumption without increasing the withstand voltage of horizontal deflection current supply means supplying a horizontal deflection current to a horizontal deflection coil and a television receiver comprising the same.

A horizontal deflection circuit according to an aspect of the present invention comprises input means for inputting a video signal, video signal conversion means for deleting a prescribed number of horizontal scanning lines from a vertical blanking interval in the video signal input by the input means and assigning a time corresponding to the deleted horizontal scanning lines to horizontal blanking intervals of the remaining horizontal scanning lines thereby extending the horizontal blanking interval of each horizontal scanning line and horizontal deflection current supply means for supplying a horizontal deflection current to a horizontal deflection coil for retracing an electron beam in each horizontal blanking interval extended by the video signal conversion means.

In the horizontal deflection circuit according to this aspect, the video signal conversion means deletes the prescribed number of horizontal scanning lines from the vertical blanking interval and assigns the time corresponding to the deleted horizontal scanning lines to the horizontal blanking intervals of the remaining horizontal scanning lines thereby extending the horizontal blanking interval of each horizontal scanning line, whereby the pulse width of a pulse voltage generated on the horizontal deflection coil is expanded in the horizontal blanking interval. Thus, a power supply voltage can be increased without increasing the level of the pulse voltage generated on the horizontal deflection coil. In other words, a higher power supply voltage can be employed when the withstand voltage of the horizontal deflection current supply means supplying the horizontal deflection current to the horizontal deflection coil is left intact. Therefore, the power supply voltage can be increased for reducing the horizontal deflection current without increasing the withstand voltage of the horizontal deflection current supply means, thereby reducing power consumption of the horizontal deflection circuit.

The input means may include analog-to-digital conversion means for performing analog-to-digital conversion on the video signal and outputting a digital signal, and the video signal conversion means may include storage means for storing the digital signal output from the analog-to-digital conversion means, control means for controlling writing and reading of the digital signal in and from the storage means thereby deleting the prescribed number of horizontal scanning lines from the vertical blanking interval and extending the horizontal blanking interval of each horizontal scanning line and digital-to-analog conversion means for performing digital-to-analog conversion on the digital signal read from the storage means and outputting an analog signal.

In this case, the prescribed number of horizontal scanning lines can be deleted from the vertical blanking interval and the horizontal blanking interval of each horizontal scanning line can be extended by the simple function of controlling writing and reading of the digital signal in and from the storage means, whereby the horizontal deflection circuit is not complicated in structure.

The control means may include first synchronizing signal generation means for generating a vertical synchronizing signal and a first horizontal synchronizing signal, second synchronizing signal generation means for generating a second horizontal synchronizing signal having a lower frequency than the first horizontal synchronizing signal in response to the first horizontal synchronizing signal generated by the first synchronizing signal generation means, write control means for writing the digital signal output from the analog-to-digital conversion means in the storage means in response to the first horizontal synchronizing signal and the vertical synchronizing signal and read control means for reading the digital signal from the storage means while skipping digital signal components of the prescribed number of horizontal scanning lines in the vertical blanking interval in response to the second horizontal synchronizing signal and the vertical synchronizing signal.

A horizontal deflection circuit according to another aspect of the present invention comprises input means for inputting a video signal, video signal conversion means for reducing the number of horizontal scanning lines in an effective picture area of a vertical scanning interval by vertical interpolation in the video signal input by the input means and assigning a time corresponding to the reduced number of horizontal scanning lines to horizontal blanking intervals of the remaining horizontal scanning lines thereby extending the horizontal blanking interval of each horizontal scanning line and horizontal deflection current supply means for supplying a horizontal deflection current to a horizontal deflection coil for retracing an electron beam in each horizontal blanking interval extended by the video signal conversion means.

In the horizontal deflection circuit according to this aspect, the video signal conversion means reduces the number of horizontal scanning lines in the effective picture area by vertical interpolation and assigns the time corresponding to the reduced number of horizontal scanning lines to the horizontal blanking intervals of the remaining horizontal scanning lines thereby extending the horizontal blanking interval of each horizontal scanning line, whereby the pulse width of a pulse voltage generated on a horizontal deflection coil is expanded in the horizontal blanking interval. Thus, a power supply voltage can be increased without increasing the level of the pulse voltage generated on the horizontal deflection coil. In other words, a higher power supply voltage can be employed when the withstand voltage of the horizontal deflection current supply means supplying the horizontal deflection current to the horizontal deflection coil is left intact. Therefore, the power supply voltage can be increased for reducing the horizontal deflection current without increasing the withstand voltage of the horizontal deflection current supply means, thereby reducing power consumption of the horizontal deflection circuit.

The input means may include analog-to-digital conversion means for performing analog-to-digital conversion on the video signal and outputting a digital signal, and the video signal conversion means may include vertical interpolation means for performing vertical interpolation on the digital signal output from the analog-to-digital conversion means thereby reducing the number of the horizontal scanning lines in the effective picture area of the vertical scanning interval, storage means for storing the digital signal output from the vertical interpolation means, control means for controlling writing and reading of the digital signal in and from the storage means thereby extending the horizontal blanking interval of each horizontal scanning line and digital-to-analog conversion means for performing digital-to-analog conversion on the digital signal read from the storage means and outputting an analog signal.

In this case, the number of horizontal scanning lines displayed on a screen can be reduced and the horizontal blanking interval of each horizontal scanning line can be extended by the simple function of the control means controlling writing and reading of the digital signal in and from the storage means, whereby the horizontal deflection circuit is not complicated in structure.

The control means may include first synchronizing signal generation means for generating a vertical synchronizing signal and a first horizontal synchronizing signal, second synchronizing signal generation means for generating a second horizontal synchronizing signal having a lower frequency than the first horizontal synchronizing signal in response to the first horizontal synchronizing signal generated by the first synchronizing signal generation means, write control means for writing the digital signal output from the analog-to-digital conversion means in the storage means in response to the first horizontal synchronizing signal and the vertical synchronizing signal and read control means for reading the digital signal from the storage means in response to the second horizontal synchronizing signal and the vertical synchronizing signal.

A horizontal deflection circuit according to still another aspect of the present invention comprises an input circuit inputting a video signal, a video signal conversion circuit deleting a prescribed number of horizontal scanning lines from a vertical blanking interval in the video signal input by the input circuit and assigning a time corresponding to the deleted horizontal scanning lines to horizontal blanking intervals of the remaining horizontal scanning lines thereby extending the horizontal blanking interval of each horizontal scanning line and a horizontal deflection current supply circuit supplying a horizontal deflection current to a horizontal deflection coil for retracing an electron beam in each horizontal blanking interval extended by the video signal conversion circuit.

In the horizontal deflection circuit according to this aspect, the video signal conversion circuit deletes the prescribed number of horizontal scanning lines from the vertical blanking interval and assigns the time corresponding to the deleted horizontal scanning lines to the horizontal blanking intervals of the remaining horizontal scanning lines thereby extending the horizontal blanking interval of each horizontal scanning line, whereby the pulse width of a pulse voltage generated on the horizontal deflection coil is expanded in the horizontal blanking interval. Thus, a power supply voltage can be increased without increasing the level of the pulse voltage generated on the horizontal deflection coil. In other words, a higher power supply voltage can be employed when the withstand voltage of the horizontal deflection current supply circuit supplying the horizontal deflection current to the horizontal deflection coil is left intact. Therefore, the power supply voltage can be increased for reducing the horizontal deflection current without increasing the withstand voltage of the horizontal deflection current supply circuit, thereby reducing power consumption of the horizontal deflection circuit.

The input circuit may include an analog-to-digital converter performing analog-to-digital conversion on the video signal and outputting a digital signal, and the video signal conversion circuit may include a memory storing the digital signal output from the analog-to-digital converter, a control circuit controlling writing and reading of the digital signal in and from the memory thereby deleting the prescribed number of horizontal scanning lines from the vertical blanking interval and extending the horizontal blanking interval of each horizontal scanning line and a digital-to-analog converter performing digital-to-analog conversion on the digital signal read from the memory and outputting an analog signal.

The control circuit may include a first synchronizing signal generation circuit generating a vertical synchronizing signal and a first horizontal synchronizing signal, a second synchronizing signal generation circuit generating a second horizontal synchronizing signal having a lower frequency than the first horizontal synchronizing signal in response to the first horizontal synchronizing signal generated by the first synchronizing signal generation circuit, a write control circuit writing the digital signal output from the analog-to-digital converter in the memory in response to the first horizontal synchronizing signal and the vertical synchronizing signal and a read control circuit reading the digital signal from the memory while skipping digital signal components of the prescribed number of horizontal scanning lines in the vertical blanking interval in response to the second horizontal synchronizing signal and the vertical synchronizing signal.

A horizontal deflection circuit according to a further aspect of the present invention comprises an input circuit inputting a video signal, a video signal conversion circuit reducing the number of horizontal scanning lines in an effective picture area of a vertical scanning interval by vertical interpolation in the video signal input by the input circuit and assigning a time corresponding to the reduced number of horizontal scanning lines to horizontal blanking intervals of the remaining horizontal scanning lines thereby extending the horizontal blanking interval of each horizontal scanning line and a horizontal deflection current supply circuit supplying a horizontal deflection current to a horizontal deflection coil for retracing an electron beam in each horizontal blanking interval extended by the video signal conversion circuit.

In the horizontal deflection circuit according to this aspect, the video signal conversion circuit reduces the number of horizontal scanning lines in the effective picture area by vertical interpolation and assigns the time corresponding to the reduced number of horizontal scanning lines to the horizontal blanking intervals of the remaining horizontal scanning lines thereby extending the horizontal blanking interval of each horizontal scanning line, whereby the pulse width of a pulse voltage generated on the horizontal deflection coil is expanded in the horizontal blanking interval. Thus, a power supply voltage can be increased without increasing the level of the pulse voltage generated on the horizontal deflection coil. In other words, a higher power supply voltage can be employed when the withstand voltage of the horizontal deflection current supply circuit supplying the horizontal deflection current to the horizontal deflection coil is left intact. Therefore, the power supply voltage can be increased for reducing the horizontal deflection current without increasing the withstand voltage of the horizontal deflection current supply circuit, thereby reducing power consumption of the horizontal deflection circuit.

The input circuit may include an analog-to-digital converter performing analog-to-digital conversion on the video signal and outputting a digital signal, and the video signal conversion circuit may include a vertical interpolation circuit performing vertical interpolation on the digital signal output from the analog-to-digital converter thereby reducing the number of horizontal scanning lines in the effective picture area of the vertical scanning interval, a memory storing the digital signal output from the vertical interpolation circuit, a control circuit controlling writing and reading of the digital signal in and from the memory thereby extending the horizontal blanking period of each horizontal scanning line and a digital-to-analog converter performing digital-to-analog conversion on the digital signal read from the memory and outputting an analog signal.

The control circuit may include a first synchronizing signal generation circuit generating a vertical synchronizing signal and a first horizontal synchronizing signal, a second synchronizing signal generation circuit generating a second horizontal synchronizing signal having a lower frequency than the first horizontal synchronizing signal in response to the first horizontal synchronizing signal generated by the first synchronizing signal generation circuit, a write control circuit writing the digital signal output from the analog-to-digital converter in the memory in response to the first horizontal synchronizing signal and the vertical synchronizing signal and a read control circuit reading the digital signal from the memory in response to the second horizontal synchronizing signal and the vertical synchronizing signal.

A television receiver according to a further aspect of the present invention comprises input means for inputting a video signal, video signal conversion means for deleting a prescribed number of horizontal scanning lines from a vertical blanking interval in the video signal input by the input means and assigning a time corresponding to the deleted horizontal scanning lines to horizontal blanking intervals of the remaining horizontal scanning lines thereby extending the horizontal blanking interval of each horizontal scanning line, video signal processing means for extracting video information, a horizontal synchronizing signal and a vertical synchronizing signal from the video signal output by the video signal conversion means, a cathode ray tube having a horizontal deflection coil and a vertical deflection coil for scanning an electron beam with the horizontal deflection coil and the vertical deflection coil and displaying an image in response to the video information output from the video signal processing means, horizontal deflection current supply means for supplying a horizontal deflection current to the horizontal deflection coil of the cathode ray tube in synchronization with the horizontal synchronizing signal output from the video signal processing means and vertical deflection current supply means for supplying a vertical deflection current to the vertical deflection coil of the cathode ray tube in synchronization with the horizontal synchronizing signal and the vertical synchronizing signal output from the video signal processing means.

In the television according to this aspect, the video signal conversion means deletes the prescribed number of horizontal scanning lines from the vertical blanking interval and assigns the time corresponding to the deleted horizontal scanning lines to the horizontal blanking intervals of the remaining horizontal scanning lines thereby extending the horizontal blanking interval of each horizontal scanning line, whereby the pulse width of a pulse voltage generated on the horizontal deflection coil is expanded in the horizontal blanking interval. Thus, a power supply voltage can be increased without increasing the level of the pulse voltage generated on the horizontal deflection coil. In other words, a higher power supply voltage can be employed when the withstand voltage of the horizontal deflection current supply means supplying the horizontal deflection current to the horizontal deflection coil is left intact. Therefore, the power supply voltage can be increased for reducing power consumption of the horizontal deflection current supply means without increasing the withstand voltage of the horizontal deflection current supply means.

The input means may include analog-to-digital conversion means for performing analog-to-digital conversion on the video signal and outputting a digital signal, and the video signal conversion means may include storage means for storing the digital signal output from the analog-to-digital conversion means, control means for controlling writing and reading of the digital signal in and from the storage means thereby deleting the prescribed number of horizontal scanning lines from the vertical blanking interval and extending the horizontal blanking interval of each horizontal scanning line and digital-to-analog conversion means for performing digital-to-analog conversion on the digital signal read from the storage means and outputting an analog signal.

A television receiver according to a further aspect of the present invention comprises input means for inputting a video signal, video signal conversion means for reducing the number of horizontal scanning lines in an effective picture area of a vertical scanning interval by vertical interpolation in the video signal input by the input means and assigning a time corresponding to the reduced number of horizontal scanning lines to horizontal blanking intervals of the remaining horizontal scanning lines thereby extending the horizontal blanking interval of each horizontal scanning line, video signal processing means for extracting video information, a horizontal synchronizing signal and a vertical synchronizing signal from the video signal output by the video signal conversion means, a cathode ray tube having a horizontal deflection coil and a vertical deflection coil for scanning an electron beam with the horizontal deflection coil and the vertical deflection coil and displaying an image in response to the video information output from the video signal processing means, horizontal deflection current supply means for supplying a horizontal deflection current to the horizontal deflection coil of the cathode ray tube in synchronization with the horizontal synchronizing signal output from the video signal processing means and vertical deflection current supply means for supplying a vertical deflection current to the vertical deflection coil of the cathode ray tube in synchronization with the horizontal synchronizing signal and the vertical synchronizing signal output from the video signal processing means.

In the television receiver according to this aspect, the video signal conversion means reduces the number of horizontal scanning lines in the effective picture area by vertical interpolation and assigns the time corresponding to the reduced number of horizontal scanning lines to the horizontal blanking intervals of the remaining horizontal scanning lines thereby extending the horizontal blanking interval of each horizontal scanning line, whereby the pulse width of a pulse voltage generated on the horizontal deflection coil is expanded in the horizontal blanking interval. Thus, a power supply voltage can be increased without increasing the level of the pulse voltage generated on the horizontal deflection coil. In other words, a higher power supply voltage can be employed when the withstand voltage of the horizontal deflection current supply means supplying the horizontal deflection current to the horizontal deflection coil is left intact. Therefore, the power supply voltage can be increased for reducing the horizontal deflection current without increasing the withstand voltage of the horizontal deflection current supply means, thereby reducing power consumption of the horizontal deflection current supply means.

The input means may include analog-to-digital conversion means for performing analog-to-digital conversion on the video signal and outputting a digital signal, and the video signal conversion means may include vertical interpolation means for performing vertical interpolation on the digital signal output from the analog-to-digital conversion means thereby reducing the number of horizontal scanning lines in the effective picture area of the vertical scanning interval, storage means for storing the digital signal output from the vertical interpolation means, control means for controlling writing and reading of the digital signal in and from the storage means thereby extending the horizontal blanking interval of each horizontal scanning line and digital-to-analog conversion means for performing digital-to-analog conversion on the digital signal read from the storage means and outputting an analog signal.

A television receiver according to a further aspect of the present invention comprises an input circuit inputting a video signal, a video signal conversion circuit deleting a prescribed number of horizontal scanning lines from a vertical blanking interval in the video signal input by the input circuit and assigning a time corresponding to the deleted horizontal scanning lines to horizontal blanking intervals of the remaining horizontal scanning lines thereby extending the horizontal blanking interval of each horizontal scanning line, a video signal processing circuit extracting video information, a horizontal synchronizing signal and a vertical synchronizing signal from the video signal output by the video signal conversion circuit, a cathode ray tube having a horizontal deflection coil and a vertical deflection coil for scanning an electron beam with the horizontal deflection coil and the vertical deflection coil and displaying an image in response to the video information output from the video signal processing circuit, a horizontal deflection current supply circuit supplying a horizontal deflection current to the horizontal deflection coil of the cathode ray tube in synchronization with the horizontal synchronizing signal output from the video signal processing circuit and a vertical deflection current supply circuit supplying a vertical deflection current to the vertical deflection coil of the cathode ray tube in synchronization with the horizontal synchronizing signal and the vertical synchronizing signal output from the video signal processing circuit.

The input circuit may include an analog-to-digital converter performing analog-to-digital conversion on the video signal and outputting a digital signal, and the video signal conversion circuit may include a memory storing the digital signal output from the analog-to-digital converter, a control circuit controlling writing and reading of the digital signal in and from the memory thereby deleting the prescribed number of horizontal scanning lines from the vertical blanking interval and extending the horizontal blanking interval of each horizontal scanning line and a digital-to-analog converter performing digital-to-analog conversion on the digital signal read from the memory and outputting an analog signal.

A television receiver according to a further aspect of the present invention comprises an input circuit inputting a video signal, a video signal conversion circuit reducing the number of horizontal scanning lines in an effective picture area of a vertical scanning interval by vertical interpolation in the video signal input by the input circuit and assigning a time corresponding to the reduced number of horizontal scanning lines to horizontal blanking intervals of the remaining horizontal scanning lines thereby extending the horizontal blanking interval of each horizontal scanning line, a video signal processing circuit extracting video information, a horizontal synchronizing signal and a vertical synchronizing signal from the video signal output by the video signal conversion circuit, a cathode ray tube having a horizontal deflection coil and a vertical deflection coil for scanning an electron beam with the horizontal deflection coil and the vertical deflection coil and displaying an image in response to the video information output from the video signal processing circuit, a horizontal deflection current supply circuit supplying a horizontal deflection current to the horizontal deflection coil of the cathode ray tube in synchronization with the horizontal synchronizing signal output from the video signal processing circuit and a vertical deflection current supply circuit supplying a vertical deflection current to the vertical deflection coil of the cathode ray tube in synchronization with the horizontal synchronizing signal and the vertical synchronizing signal output from the video signal processing circuit.

The input circuit may include an analog-to-digital converter performing analog-to-digital conversion on the video signal and outputting a digital signal, and the video signal conversion circuit may include a vertical interpolation circuit performing vertical interpolation on the digital signal output from the analog-to-digital converter thereby reducing the number of horizontal scanning lines in the effective picture area of the vertical scanning interval, a memory storing the digital signal output from the vertical interpolation circuit, a control circuit controlling writing and reading of the digital signal in and from the memory thereby extending the horizontal blanking interval of each horizontal scanning line and a digital-to-analog converter performing digital-to-analog conversion on the digital signal read from the memory and outputting an analog signal.

According to the present invention, as hereinabove described, the prescribed number of horizontal scanning lines are deleted from the vertical blanking period and the time corresponding to the deleted horizontal scanning lines is assigned to the horizontal blanking intervals of the remaining horizontal scanning lines thereby extending the horizontal blanking interval of each horizontal scanning line, whereby the pulse width of the pulse voltage generated on the horizontal deflection coil is expanded in the horizontal blanking interval. Thus, the power supply voltage can be increased without increasing the level of the pulse voltage generated on the horizontal deflection coil. Therefore, the power supply voltage can be increased and the horizontal deflection current can be reduced without increasing the withstand voltage of the horizontal deflection current supply means supplying the horizontal deflection current to the horizontal deflection coil. Consequently, power consumption of the horizontal deflection circuit can be reduced.

Further, the number of horizontal scanning lines in the effective picture area of the vertical scanning interval is reduced by vertical interpolation and the time corresponding to the reduced number of horizontal scanning lines is assigned to horizontal blanking intervals of the remaining horizontal scanning lines thereby extending the horizontal blanking interval of each horizontal scanning line, whereby the pulse width of the pulse voltage generated on the horizontal deflection coil is expanded in the horizontal blanking interval. Thus, the power supply voltage can be increased without increasing the level of the pulse voltage generated on the horizontal deflection coil. Therefore, the power supply voltage can be increased and the horizontal deflection current can be reduced without increasing the withstand voltage of the horizontal deflection current supply means supplying the horizontal deflection current to the horizontal deflection coil. Consequently, power consumption of the horizontal deflection circuit can be reduced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 8(a) to 8(c) are waveform diagrams for illustrating conversion of video signals in the video signal conversion part shown in FIG. 7.

DESCRIPTION OF THE PREFERRED EMBODIMENTS

First Embodiment

Figure 1:
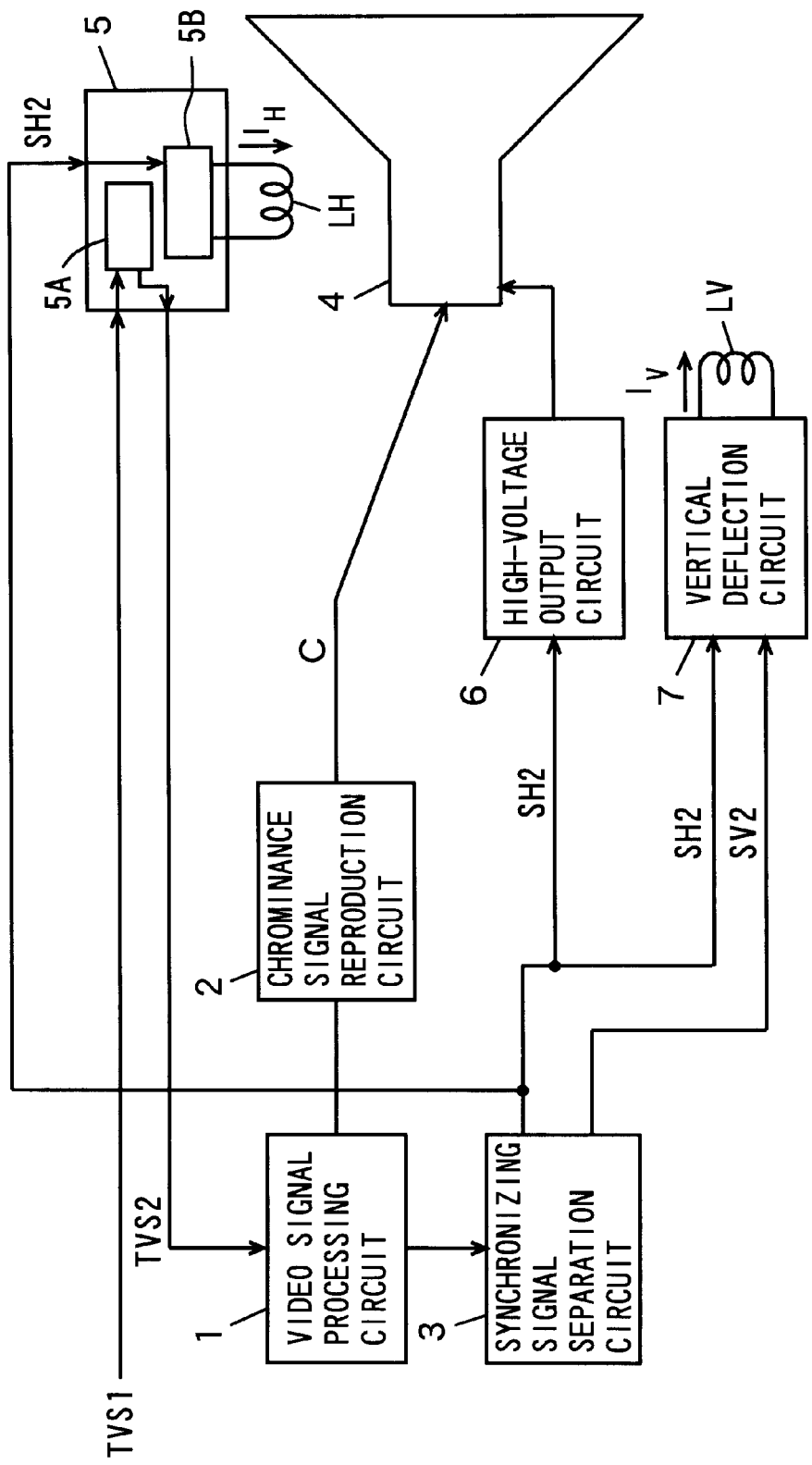
FIG. 1 is a block diagram showing the structure of a television receiver according to a first embodiment of the present invention.

A first embodiment of the present invention is now described with reference to FIGS. 1 to 6(c). FIG. 1 is a block diagram showing the structure of a television receiver according to the first embodiment of the present invention.

The television receiver shown in FIG. 1 includes a video signal processing circuit 1, a chrominance signal reproduction circuit 2, a synchronizing signal separation circuit 3, a cathode ray tube (CRT) 4, a horizontal deflection circuit 5, a high-voltage output circuit 6 and a vertical deflection circuit 7. A horizontal deflection yoke LH and a vertical deflection yoke LV are mounted on the cathode ray tube 4.

The video signal processing circuit 1 separates a luminance signal and a color difference signal from a video signal TVS2 supplied from the horizontal deflection circuit 5 described later and outputs the signals while supplying the video signal TVS2 to the synchronizing signal separation circuit 3. The chrominance signal reproduction circuit 2 reproduces a chrominance signal from the luminance signal and the color difference signal output from the video signal processing circuit 1 and supplies the reproduced chrominance signal to the cathode ray tube 4 as a display signal C. The synchronizing signal separation circuit 3 extracts a horizontal synchronizing signal SH2 and a vertical synchronizing signal SV2 from the video signal TVS2 supplied from the video signal processing circuit 1.

The horizontal deflection circuit 5 includes a video signal conversion part 5A converting an input video signal TVS1 to the video signal TVS2 and an output part 5B supplying a sawtooth horizontal deflection current $I_H$ to the horizontal deflection yoke LH in synchronization with the horizontal synchronizing signal SH2 output from the synchronizing signal separation circuit 3. The structures and operations of the video signal conversion part 5A and the output part 5B are described later.

The high-voltage output circuit 6 includes a high-voltage drive circuit, a flyback transformer, a dynamic auto focus control circuit and a dynamic auto focus output circuit and outputs a high voltage to the cathode ray tube 4 for focus control or the like.

The vertical deflection circuit 7, including a vertical output circuit, supplies a sawtooth vertical deflection current $I_V$ to the vertical deflection yoke LV for vertically deflecting an electron beam in the cathode ray tube 4 in synchronization with the horizontal synchronizing signal SH2 and the vertical synchronizing signal SV2 output from the synchronizing signal separation circuit 3.

According to this embodiment, the video signal conversion part 5A corresponds to the input means and the video signal conversion means or the input circuit and the video signal conversion circuit, the output part 5B corresponds to the horizontal deflection current supply means or the horizontal current supply circuit, and the horizontal deflection yoke LH corresponds to the horizontal deflection coil. The video signal processing circuit 1, the chrominance signal reproduction circuit 2 and the synchronizing signal separation circuit 3 form the video signal processing means or the video signal processing circuit, the vertical deflection circuit 7 corresponds to the vertical deflection current supply means or the vertical deflection current supply circuit, and the vertical deflection yoke LV corresponds to the vertical deflection coil. A synchronizing signal separation circuit 15 corresponds to the first synchronizing signal generation means or the first synchronizing signal generation circuit, an expanded horizontal synchronizing pulse generation circuit 17 corresponds to the second synchronizing signal generation means or the second synchronizing signal generation circuit, a video memory write control circuit 16 corresponds to the write control means or the write control circuit, and a video memory read control circuit 18 corresponds to the read control means or the read control circuit.

Figure 2:
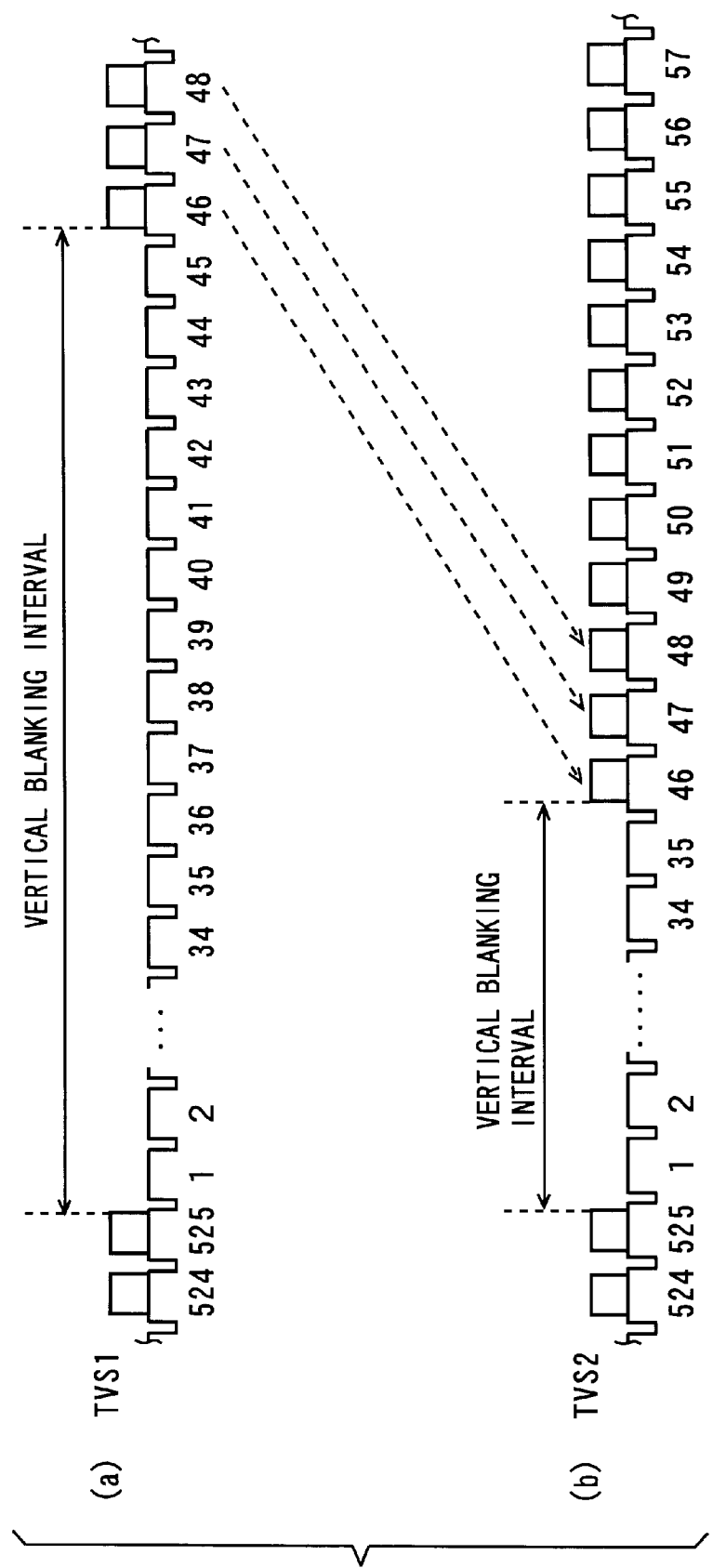
FIGS. 2(a) and 2(b) are waveform diagrams for illustrating conversion of video signals in a video signal conversion part shown in FIG. 1.
Figure 3:
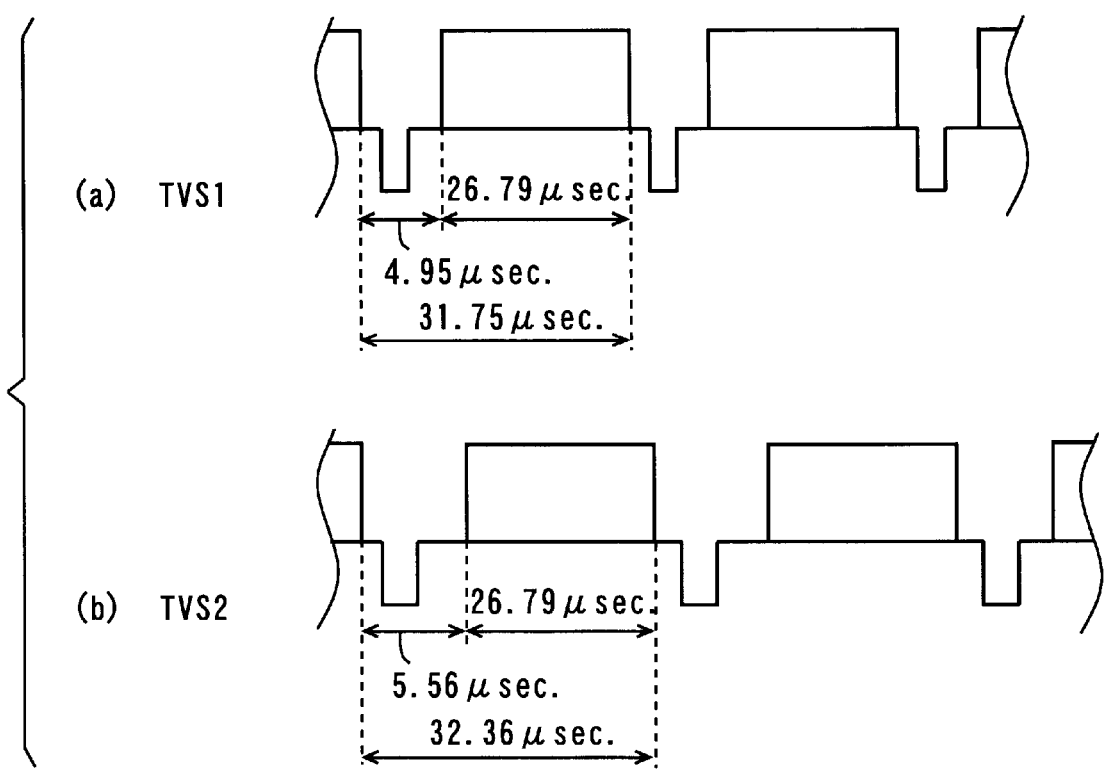
FIGS. 3(a) and 3(b) illustrate parts of the video signals shown in FIGS. 2(a) and 2(b) in an enlarged manner.

FIGS. 2(*a*) and 2(*b*) are waveform diagrams for illustrating conversion of the video signals TVS1 and TVS2 in the video signal conversion part 5A shown in FIG. 1, and FIGS. 3(*a*) and 3(*b*) illustrate parts of the video signals TVS1 and TVS2 shown in FIGS. 2(*a*) and 2(*b*) in an enlarged manner.

FIGS. 2(*a*) and 2(*b*) show waveforms in vertical blanking intervals of the video signals TVS1 and TVS2 and around the same respectively. In this embodiment, it is assumed that the video signal TVS1 is an NTSC video signal.

As to the video signal TVS1 input in the video signal conversion part 5A shown in FIG. 1, it is assumed that a vertical scanning interval has 525 horizontal scanning lines and 480 effective scanning lines and the vertical scanning frequency is 60 Hz, for example, as shown in FIG. 2(*a*). In this case, a vertical blanking interval has 45 horizontal scanning lines. The term "effective scanning lines" stands for horizontal scanning lines forming an effective picture area (corresponding to an interval other than the vertical blanking interval) within the vertical scanning interval.

The video signal conversion part 5A of the horizontal deflection circuit 5 converts the video signal TVS1 to the video signal TVS2. As to the video signal TVS2, a vertical scanning interval has 515 horizontal scanning lines and 480 effective scanning lines and the vertical scanning frequency is 60 Hz, for example, as shown in FIG. 2(*b*). In this case, the vertical blanking interval of the video signal TVS2 has 35 horizontal scanning lines. Thus, the number of horizontal scanning lines in the vertical blanking interval of the video signal TVS2 is smaller by 10 than that in the vertical blanking interval of the video signal TVS1.

As shown in FIG. 3(*a*), the video signal TVS1 has a horizontal blanking interval (no signal interval) of about 4.95 $\mu$sec., a video signal interval (horizontal scanning interval) of about 26.79 $\mu$sec. and a horizontal scanning line period, formed by the horizontal blanking interval and the video signal interval, of about 31.75 $\mu$sec. In this case, the horizontal scanning frequency of the video signal TVS1 is 31.5 kHz.

As shown in FIG. 3(*b*), on the other hand, the video signal TVS2 has a horizontal blanking interval of about 5.56 $\mu$sec., a video signal interval of about 26.79 $\mu$sec. and a horizontal scanning line period of about 32.36 $\mu$sec. In other words, the horizontal blanking interval of the video signal TVS2 is extended by about 0.61 $\mu$sec. as compared with the horizontal blanking interval of the video signal TVS1. Thus, the horizontal scanning line period of the video signal TVS2 is longer by about 0.61 $\mu$sec. than the horizontal scanning line period o the video signal TVS1. In this case, the horizontal scanning frequency of the video signal TVS2 is 31.5×515/525=30.9 kHz.

Thus, a prescribed number of, e.g., 10 horizontal scanning lines are deleted from the vertical blanking interval of the video signal TVS1 and the time corresponding to the deleted horizontal scanning lines is assigned to horizontal blanking intervals of the remaining horizontal scanning lines thereby extending the horizontal blanking interval of each horizontal scanning line.

Figure 4:
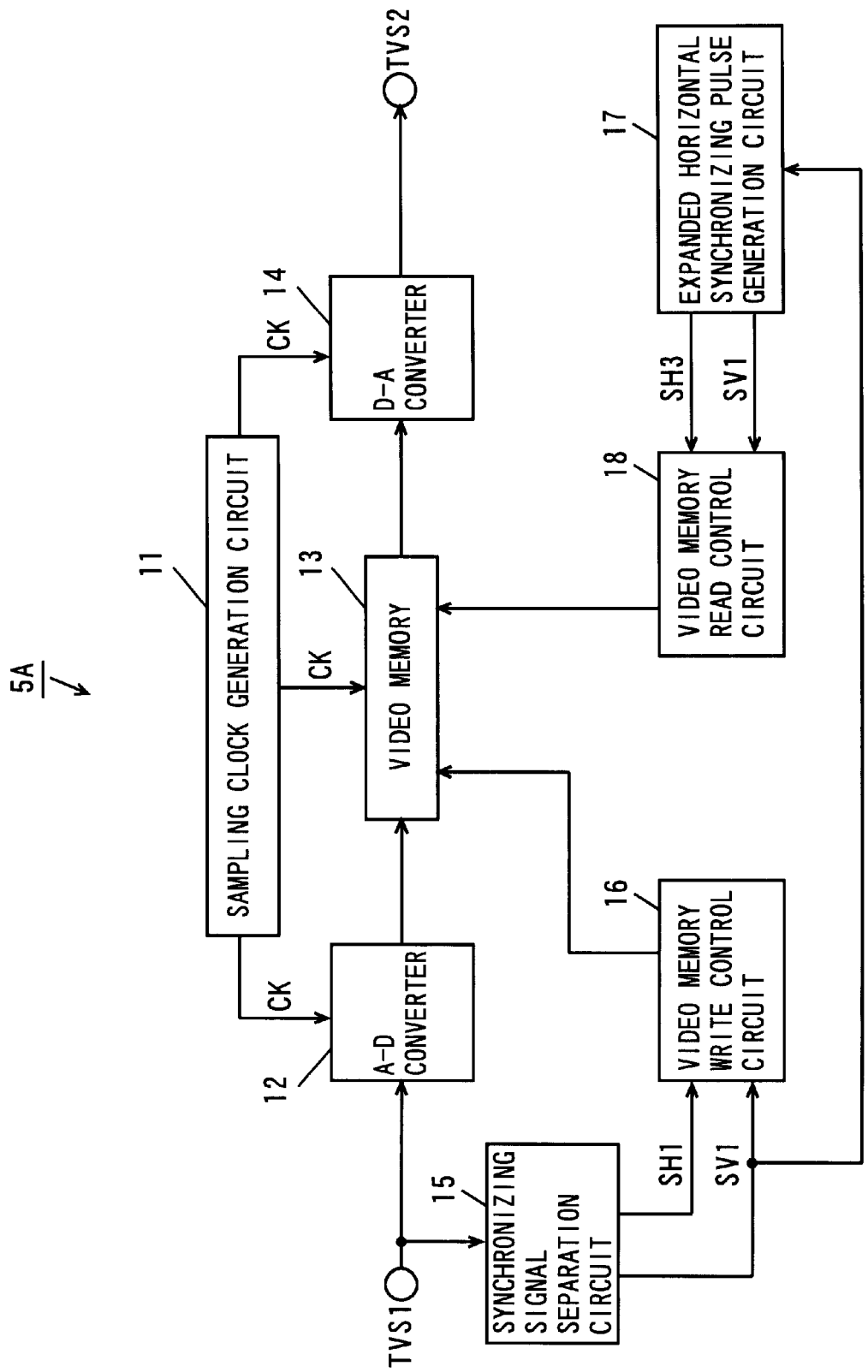
FIG. 4 is a block diagram showing the structure of the video signal conversion part of a horizontal deflection circuit shown in FIG. 1.

FIG. 4 is a block diagram showing the structure of the video signal conversion part 5A. The video signal conversion part 5A includes a sampling clock generation circuit 11, an analog-to-digital (A-D) converter 12, a video memory 13, a digital-to-analog (D-A) converter 14, the synchronizing signal separation circuit 15, the video memory write control circuit 16, the expanded horizontal synchronizing pulse generation circuit 17 and the video memory read control circuit 18.

The sampling clock generation circuit 11 generates a sampling clock CK of a prescribed frequency. The A-D converter 12 performs sampling in response to the sampling clock CK output from the sampling clock generation circuit 11, for converting the video signal TVS1 to a digital signal. The video memory 13 stores the digital signal output from the A-D converter 12 in response to the sampling clock CK. The D-A converter 14 converts the digital signal read from the video memory 13 to an analog signal in response to the sampling clock CK and outputs the analog signal as the video signal TVS2.

The synchronizing signal separation circuit 15 extracts a horizontal synchronizing signal SH1 and a vertical synchronizing signal SV1 from the video signal TVS1. The video memory write control circuit 16 writes the digital signal output from the A-D converter 12 in the video memory 13 on the basis of the horizontal synchronizing signal SH1 and the vertical synchronizing signal SV1 output from the synchronizing signal separation circuit 15.

The expanded horizontal synchronizing pulse generation circuit 17 outputs a horizontal synchronizing signal SH3 having a lower frequency than the horizontal synchronizing signal SH1 while outputting the vertical synchronizing signal SV1 on the basis of the vertical synchronizing signal SV1 output from the synchronizing signal separation circuit 15. The frequency of the horizontal synchronizing signal SH1 is 31.5 kHz, for example, and the frequency of the horizontal synchronizing signal SH3 is 30.9 kHz, for example.

The video memory read control circuit 18 supplies an address signal to the video memory 13 to start reading the digital signal of a single vertical scanning interval from the video memory 13 in response to the vertical synchronizing signal SV1 output from the expanded horizontal synchronizing pulse generation circuit 17, read digital signal components corresponding to 35 horizontal scanning lines, for example, in the vertical blanking interval, thereafter skip digital signal components corresponding to a prescribed number of, e.g., 10 horizontal scanning lines, and read a digital signal component corresponding to the 46$^{th}$ horizontal scanning line following the digital signal component corresponding to the 35$^{th}$ horizontal scanning line. Thus, the single vertical scanning interval of the digital signal read from the video memory 13 has 515 horizontal scanning lines.

At this time, the video memory read control circuit 18 decides read timing per horizontal scanning on the basis of the horizontal synchronizing signal SH3 output from the expanded horizontal synchronizing pulse generation circuit 17. In other words, the video memory read control circuit 18 delays read start timing of the video memory 13 in the horizontal blanking interval (silence interval) by a prescribed time. This delay time, corresponding to the difference between the cycles of the horizontal synchronizing signals SH1 an SH3, is about 0.61 μsec. in the examples shown in FIGS. 2(a) and 2(b). Thus, the horizontal blanking interval is extended to about 5.56 μsec., and the digital signal corresponding to each horizontal scanning line is read in synchronization with the horizontal synchronizing signal SH3.

In this case, the total of the horizontal scanning line periods of the deleted 10 horizontal scanning lines and the total of the extended times of the horizontal blanking intervals of the remaining 515 horizontal scanning lines coincide with each other, and hence the vertical scanning frequencies of the video signals TVS1 and TVS2 are equally 60 Hz.

In this embodiment, the A-D converter 12 corresponds to the input means and the analog-to-digital conversion means, and the video memory 13, the D-A converter 14, the synchronizing signal separation circuit 15, the video memory write control circuit 16, the expanded horizontal synchronizing pulse generation circuit 17 and the video memory read control circuit 18 form the video signal conversion means. The video memory 13 corresponds to the storage means, the video memory write control circuit 16, the expanded horizontal synchronizing pulse generation circuit 17 and the video memory read control circuit 18 form the control means, and the D-A converter 14 corresponds to the digital-to-analog conversion means.

Figure 5:
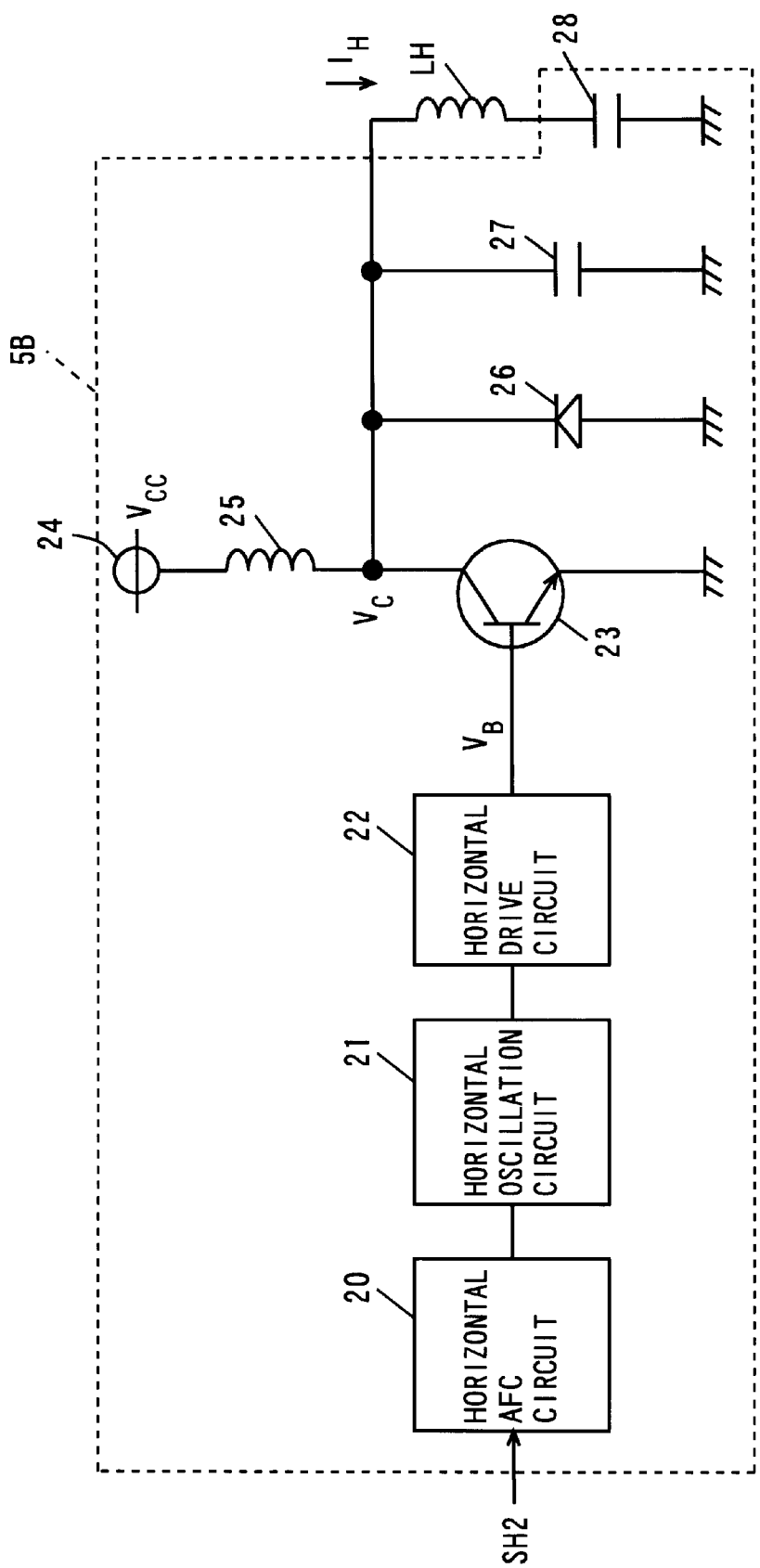
FIG. 5 is a block diagram showing the structure of an output part of the horizontal deflection circuit shown in FIG. 1.
Figure 6:
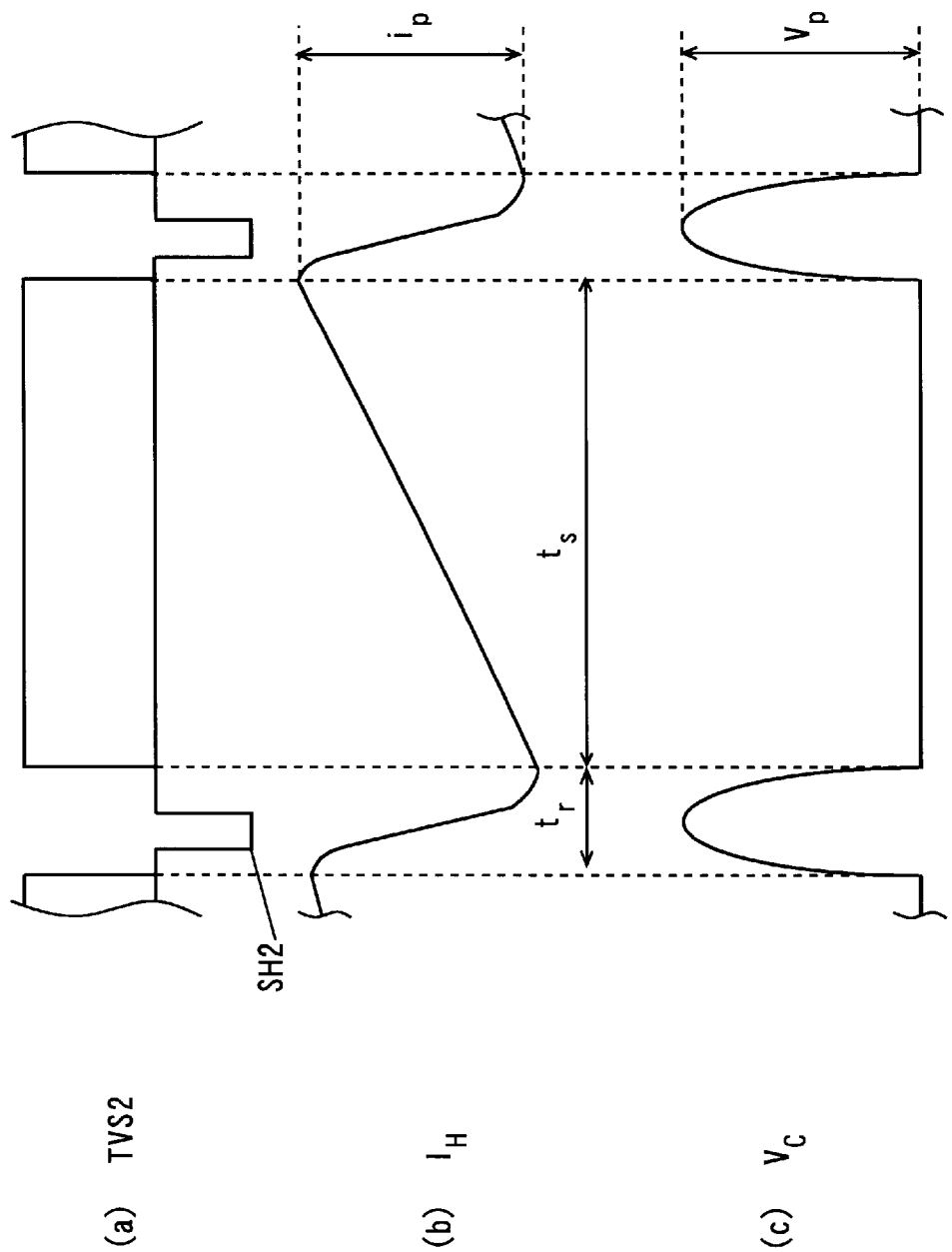
FIGS. 6(a) to 6(c) are waveform diagrams for illustrating operations of the output part shown in FIG. 5.

FIG. 5 is a block diagram showing the structure of the output part 5B. FIGS. 6(a) to 6(c) are waveform diagrams for illustrating operations of the output part 5B.

The output part 5B includes a horizontal AFC (automatic frequency control) circuit 20, a horizontal oscillation circuit 21, a horizontal drive circuit 22, a horizontal output transistor 23, a power supply terminal 24, a choke coil 25, a damper diode 26, a resonance capacitor 27 and a sigmoid correction capacitor 28.

The horizontal AFC circuit 20 prevents the horizontal synchronizing signal SH2 output from the synchronizing signal separation circuit 3 shown in FIG. 1 from disturbance of horizontal synchronization caused by contamination with noise. Thus, the horizontal AFC circuit 20 improves stability of the oscillation frequency of the horizontal oscillation circuit 21 described later. The horizontal oscillation circuit 21 generates a pulse signal in synchronization with the horizontal synchronizing signal SH2 supplied through the horizontal AFC circuit 20. The horizontal drive circuit 22 amplifies and waveform-shapes the pulse signal output from the horizontal oscillation circuit 21 and supplies this pulse signal to the base of the horizontal output transistor 23.

The horizontal output transistor 23 performs switching in response to the pulse signal supplied from the horizontal drive circuit 22. The emitter of the horizontal output transistor 23 is grounded. The collector of the horizontal output transistor 23 is connected to the power supply terminal 24 through the choke coil 25. The power supply terminal 24 is supplied with a power supply voltage $V_{CC}$.

The damper diode 26 has a cathode connected to the collector of the horizontal output transistor 23 and a grounded anode. The resonance capacitor 27 is connected in parallel with the damper diode 26. A series circuit of the horizontal deflection yoke LH and the sigmoid correction capacitor 28 is connected between the collector of the horizontal output transistor 23 and a ground terminal.

In this embodiment, the horizontal output transistor 23 corresponds to the horizontal deflection current supply means or the horizontal deflection current supply circuit.

FIG. 6(a) shows the video signal TVS2, FIG. 6(b) shows the horizontal deflection current $I_H$ flowing in the horizontal deflection yoke LH, and FIG. 6(c) shows a horizontal deflection pulse voltage $V_C$ generated on the collector of the horizontal output transistor 23.

In synchronization with the horizontal synchronizing signal SH2 of the video signal TVS2 shown in FIG. 6(a), the horizontal AFC circuit 20, the horizontal oscillation circuit 21 and the horizontal drive circuit 22 apply the pulse voltage $V_B$ to the base of the horizontal output transistor 23, which in turn performs switching. The sawtooth horizontal deflection current $I_H$ shown in FIG. 6(b) flows in the horizontal deflection yoke LH due to the switching operation of the horizontal output transistor 23 and actions of the damper diode 26 and the resonance capacitor 27. The horizontal deflection current $I_H$ has the following peak value $i_p$:

$$i_p = w/(t_S \times V_{CC}) \quad (1)$$

where $\underline{w}$ represents horizontal deflection sensitivity (unit: $HA^2$) of the horizontal deflection yoke LH, $t_S$ represents the horizontal scanning interval (unit: sec.) of the horizontal deflection current $I_H$, and $V_{CC}$ represents the power supply voltage (unit: V) of the horizontal deflection circuit 5. The horizontal deflection sensitivity $\underline{w}$ and the horizontal scanning interval $t_s$ in the above equation (1) are constant if the deflection yoke system and the scanning system are left intact. Therefore, it is understood possible to reduce the peak value $i_p$ of the horizontal deflection current $I_H$ by increasing the power supply voltage $V_{CC}$.

The horizontal deflection pulse voltage $V_C$ generated on the collector of the horizontal output transistor 23 by feeding the horizontal deflection current $I_H$ shown in FIG. 6(b) to the horizontal deflection yoke LH has the following peak value $V_p$:

$$V_p = \{(\pi/2) \times (t_s/t_r) + 1\} \times V_{CC} \quad (2)$$

where $t_r$ represents the horizontal blanking interval corresponding to the pulse width of the horizontal deflection pulse voltage $V_C$. It is understood from the above equation (2) that the peak value $V_p$ of the horizontal deflection pulse voltage $V_C$ is increased when the power supply voltage $V_{CC}$ is increased. The peak value $V_p$ of the horizontal deflection pulse voltage $V_C$ is applied across the collector and the emitter of the horizontal output transistor 23 shown in FIG. 5.

However, no peak value $V_p$ of the horizontal deflection pulse voltage $V_C$ exceeding a standard withstand voltage across the collector and the emitter of the horizontal output transistor 23 can be applied across the collector and the emitter. Therefore, the power supply voltage $V_{CC}$ must be increased in order to reduce the peak value $V_p$ of the horizontal deflection pulse voltage $V_C$ under such restriction that the peak value $V_p$ of the horizontal deflection pulse voltage $V_C$ is not in excess of the standard withstand voltage across the collector and the emitter of the horizontal output transistor 23.

In order to implement this, the ratio $t_s/t_r$ of the horizontal scanning interval $t_s$ to the horizontal blanking interval $t_r$ may be reduced as understood from the above equation (2). According to this embodiment, the horizontal blanking interval $t_r$ of the video signal TVS2 is extended by about 0.61 μsec. as compared with the horizontal blanking interval $t_r$ of the video signal TVS1 thereby reducing the aforementioned ratio $t_s/t_r$.

When the horizontal scanning interval $t_s$ of 26.79 [μsec.] and the horizontal blanking interval $t_r$ of 4.95 [μsec.] in the video signal TVS1 are substituted in the above equation (2) assuming that the power supply voltage $V_{CC}$ is 100 V, the horizontal deflection pulse voltage $V_C$ has the following peak value $V_p$:

$$V_p = \{(\pi/2) \times 26.79/4.95\} + 1\} \times 100 = 950 \ [V]$$

When the horizontal scanning interval $t_s$ of 26.79 [μsec.] and the power supply voltage $V_{CC}$ of 100 [V] are substituted in the above equation (1) assuming that the horizontal deflection sensitivity $\underline{w}$ is 30 mHA$^2$, the horizontal deflection current $I_H$ has the following peak value $i_p$:

$$i_p = \{30/(26.79 \times 100)\} \times 10^3 = 11.20 \ [A_{pp}]$$

Then, the above equation (2) is transformed to obtain the following equation:

$$V_{CC} = V_p/\{(\pi/2) \times (t_s/t_r) + 1\} \quad (3)$$

When the peak value $V_p$ of 950 [V] and the horizontal scanning interval $t_s$ of 26.79 [μsec.] and the horizontal blanking interval $t_r$ of 5.56 [μsec.] in the video signal TVS2 are substituted in the above equation (3), the power supply voltage $V_{CC}$ is expressed as follows:

$$V_{CC} = 950/[(\pi/2) \times 26.79/5.56] + 1] = 110.87 \ [V]$$

Hence, the peak value $i_p$ of the horizontal deflection current $I_H$ is expressed as follows from the above equation (1):

$$i_p = 30/(26.79 \times 110.87) = 10.10 \ [A_{pp}]$$

Thus, the peak value $i_p$ of the horizontal deflection current $I_H$ can be reduced from 11.20 $A_{pp}$ to 10.10 $A_{pp}$ without increasing the withstand voltage across the collector and the emitter of the horizontal output transistor 23 by increasing the pulse width (horizontal blanking interval) of the horizontal deflection pulse voltage $V_C$. Thus, power consumed by the horizontal deflection circuit 5 can be reduced.

In the television receiver according to this embodiment, the video memory 13, the D-A converter 14, the synchronizing signal separation circuit 15, the video memory write control circuit 16, the expanded horizontal synchronizing pulse generation circuit 17 and the video memory read control circuit 18 extend the horizontal blanking interval, whereby the pulse width of the horizontal deflection pulse voltage $V_C$ generated on the collector of the horizontal output transistor 23 can be expanded in the horizontal blanking interval. Thus, the power supply voltage $V_{CC}$ of the horizontal deflection circuit 5 can be increased and the peak value $i_p$ of the horizontal deflection current $I_H$ can be reduced without increasing the peak value $V_p$ of the horizontal deflection pulse voltage $V_C$. Therefore, power consumption of the horizontal deflection circuit 5 can be reduced without increasing the withstand voltage across the collector and the emitter of the horizontal output transistor 23 supplying the horizontal deflection current $I_H$ to the horizontal deflection yoke LH.

Second Embodiment

Figure 7:
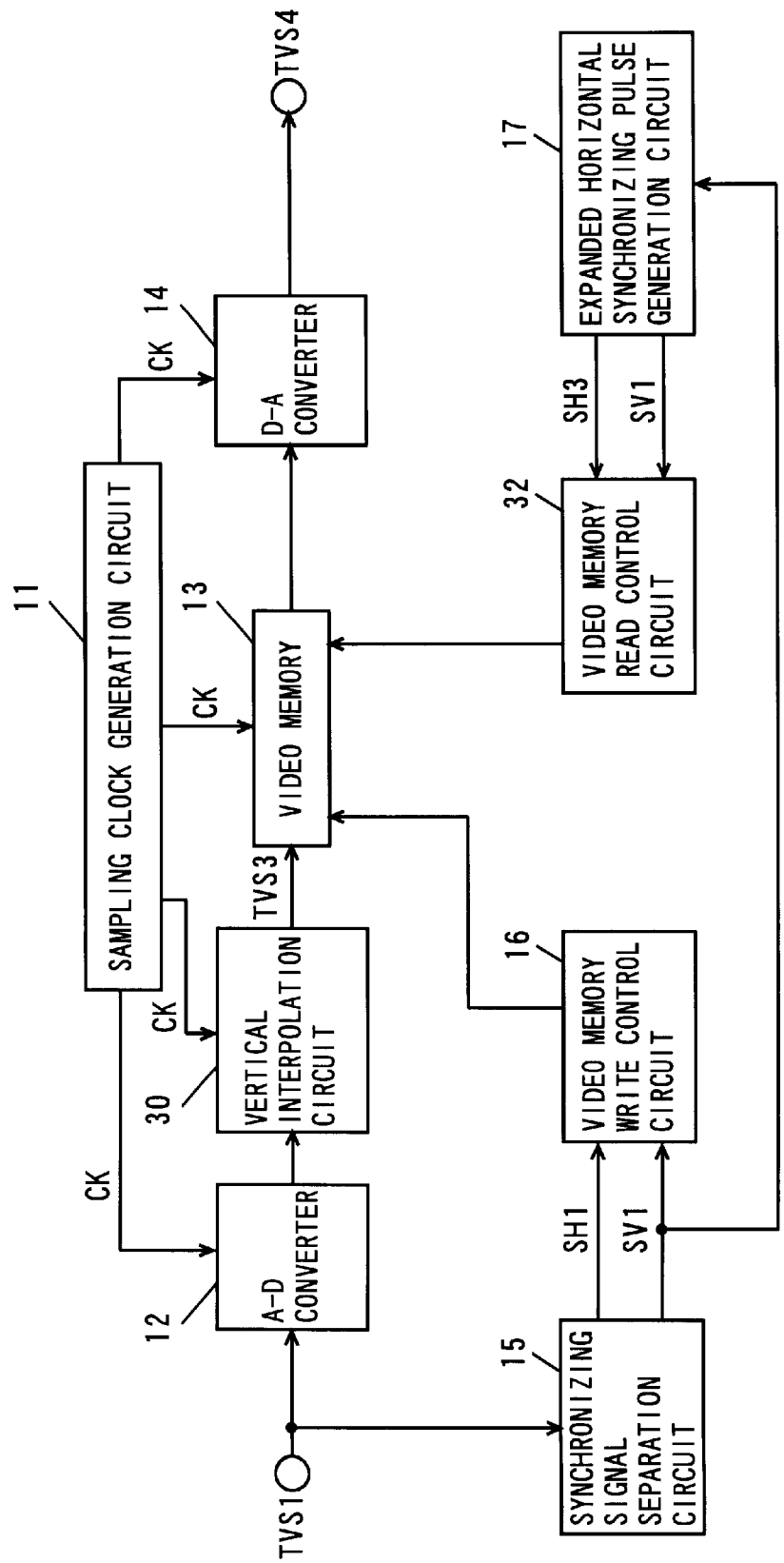
FIG. 7 is a block diagram showing the structure of a video signal conversion part of a television receiver according to a second embodiment of the present invention.

A television receiver according to a second embodiment of the present invention is now described. FIG. 7 is a block diagram showing the structure of a video signal conversion part 5C in the television receiver according to the second embodiment of the present invention. FIGS. 8(a) to 8(c) are waveform diagrams for illustrating conversion of video signals in the video signal conversion part 5C shown in FIG. 7.

The television receiver according to the second embodiment is provided with the video signal conversion part 5C shown in FIG. 7 in place of the video signal conversion part 5A of the horizontal deflection circuit 5 shown in FIG. 1. The video signal conversion part 5C converts a video signal TVS1 to a video signal TVS4 and supplies the video signal TVS4 to the video signal processing circuit 1 shown in FIG. 1.

The video signal conversion part 5C shown in FIG. 7 is different from the video signal conversion part 5A shown in FIG. 4 in a point that a vertical interpolation circuit 30 is provided between an A-D converter 12 and a video memory 13 and a point that a video memory read control circuit 32 is provided in place of the video memory read control circuit 18. The structures of the remaining parts of the video signal conversion part 5C shown in FIG. 7 are similar to those of the video signal conversion part 5A shown in FIG. 4.

The vertical interpolation circuit 30 performs vertical interpolation on a digital signal output from the A-D converter 12 in response to a sampling clock CK, thereby outputting a video signal TVS3 having a reduced number of effective scanning lines to the video memory 13.

FIGS. 8(a) to 8(c) show waveforms of vertical blanking intervals of the video signals TVS1, TVS3 and TVS4 and around the same. FIG. 8(b) shows the video signal TVS3, which is a digital signal in practice, in the form of an analog signal.

In the video signal TVS1 input in the A-D converter 12 shown in FIG. 7, a vertical scanning interval has 525 horizontal scanning lines and 480 effective scanning lines and the vertical scanning frequency is 60 Hz, for example, as shown in FIG. 8(a). In this case, a vertical blanking period has 45 horizontal scanning lines in the video signal TVS1.

The video signal TVS3 output from the vertical interpolation circuit 30 having 480 effective scanning lines is compressed to a video signal having 470 effective scanning lines, for example, as shown in FIG. 8(b). A signal having no video information is supplied to 10 effective scanning lines. In this case, the video signal TVS3 apparently has 525 horizontal scanning lines.

In the video signal TVS4 output from a D-A converter 14, a vertical scanning interval has 515 horizontal scanning lines and 470 effective scanning lines and the vertical scanning frequency is 60 Hz, for example, as shown in FIG. 8(c). In this case, a vertical blanking interval has 45 horizontal scanning lines in the video signal TVS4. Thus, the number of effective scanning lines in the video signal TVS4 is smaller by 10 than that in the video signal TVS1.

As shown in FIG. 3(a), the video signal TVS1 has a horizontal blanking interval (no signal interval) of about 4.95 μsec., a video signal interval (horizontal scanning interval) of about 26.79 μsec. and a horizontal scanning line period, formed by the horizontal blanking interval and the video signal interval, of about 31.75 μsec. In this case, horizontal scanning frequency of the video signal TVS1 is 31.5 kHz.

The video signal TVS4 has a horizontal blanking interval of about 5.56 μsec., a video signal interval of about 26.79 μsec. and a horizontal scanning line period of about 32.36 μsec., similarly to the video signal TVS2 shown in FIG. 3(b). In other words, the horizontal blanking interval of the video signal TVS4 is extended by about 0.61 μsec. as compared with the horizontal blanking interval of the video signal TVS1. Thus, the horizontal scanning line period of the video signal TVS4 is longer by about 0.61 μsec. than the horizontal scanning line period of the video signal TVS1. In this case, the horizontal scanning frequency of the video signal TVS4 is 31.5×515/525=30.9 kHz.

Thus, the number of effective horizontal scanning lines of an effective picture area is reduced by vertical interpolation and a time corresponding to the reduced number of effective scanning lines is assigned to horizontal blanking interval of the remaining horizontal scanning lines, thereby extending the horizontal blanking interval of each horizontal scanning line.

The video memory read control circuit 32 decides read timing per horizontal scanning on the basis of a horizontal synchronizing signal SH3 output from an expanded horizontal synchronizing pulse generation circuit 17. In other words, the video memory read control circuit 32 delays read start timing of the video memory 13 in the horizontal blanking interval (no signal interval) by a prescribed time. The delay time, corresponding to the difference between the cycle of a horizontal synchronizing SH1 and that of the horizontal synchronizing signal SH3, is about 0.61 μsec. in the examples shown in FIGS. 2(a) and 2(b). Thus, the horizontal blanking interval is extended to about 5.56 μsec. and a digital signal corresponding to each horizontal scanning line is read in synchronization with the horizontal synchronizing signal SH3.

In this case, the total of the horizontal scanning line periods of the deleted 10 horizontal scanning lines and the total of the extended times of the horizontal blanking intervals of the remaining 515 horizontal scanning lines coincide with each other, and hence the vertical scanning frequencies of the video signals TVS1 and TVS4 are equally 60 Hz.

In this embodiment, the vertical interpolation circuit 30, the video memory 13, the D-A converter 14, a synchronizing signal separation circuit 15, a video memory write control circuit 16, the expanded horizontal synchronizing pulse generation circuit 17 and the video memory read control circuit 32 form the video signal conversion means, the vertical interpolation circuit 30 corresponds to the vertical interpolation means, and the video memory write control circuit 16, the expanded horizontal synchronizing pulse generation circuit 17 an the video memory read control circuit 32 form the control means.

In the television receiver according to this embodiment, the vertical interpolation circuit 30, the video memory 13, the D-A converter 14, the synchronizing signal separation circuit 15, the video memory write control circuit 16, the expanded horizontal synchronizing pulse generation circuit 17 and the video memory read control circuit 32 extend the horizontal blanking interval, whereby the pulse width of a horizontal deflection pulse voltage $V_C$ generated on the collector of a horizontal output transistor 23 can be expanded in the horizontal blanking interval. Thus, a power supply voltage $V_{CC}$ of a horizontal deflection circuit 5 can be increased and a peak value $i_p$ of a horizontal deflection current $I_H$ can be reduced without increasing the peak value $V_p$ of the horizontal deflection pulse voltage $V_C$. Therefore, power consumption of the horizontal deflection circuit 5 can be reduced without increasing the withstand voltage across the collector and the emitter of the horizontal output transistor 23 supplying the horizontal deflection current $I_H$ to a horizontal deflection yoke LH.

While each of the first and second embodiments has been described with reference to a video signal formed by a composite signal including a luminance signal and a color difference signal, a component signal may alternatively be converted by a plurality of video signal conversion parts, for example.

While the video memory 13 stores a horizontal synchronizing signal and a vertical synchronizing signal along with a video information in each of the first and second embodiments, the video memory 13 may alternatively store only video information so that the horizontal synchronizing signal and the vertical synchronizing signal are generated in a free run and the video information stored in the video memory 13 is composited with the horizontal and vertical synchronizing signals later.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A horizontal deflection circuit comprising:
   input means for inputting a video signal;
   video signal conversion means for deleting a prescribed number of horizontal scanning lines from a vertical blanking interval in said video signal input by said input means and assigning a time corresponding to the deleted horizontal scanning lines to horizontal blanking intervals of the remaining horizontal scanning lines thereby extending the horizontal blanking interval of each horizontal scanning line; and
   horizontal deflection current supply means for supplying a horizontal deflection current to a horizontal deflection coil for retracing an electron beam in each horizontal blanking interval extended by said video signal conversion means.

2. The horizontal deflection circuit according to claim 1, wherein
   said input means includes analog-to-digital conversion means for performing analog-to-digital conversion on said video signal and outputting a digital signal, and
   said video signal conversion means includes:
      storage means for storing said digital signal output from said analog-to-digital conversion means,
      control means for controlling writing and reading of said digital signal in and from said storage means thereby deleting said prescribed number of horizontal scanning lines from said vertical blanking interval and extending the horizontal blanking interval of each horizontal scanning line, and
      digital-to-analog conversion means for performing digital-to-analog conversion on said digital signal read from said storage means and outputting an analog signal.

3. The horizontal deflection circuit according to claim 2, wherein
   said control means includes:
      first synchronizing signal generation means for generating a vertical synchronizing signal and a first horizontal synchronizing signal, second synchronizing signal generation means for generating a second horizontal synchronizing signal having a lower frequency than said first horizontal synchronizing signal in response to said first horizontal synchronizing signal generated by said first synchronizing signal generation means, write control means for writing said digital signal output from said analog-to-digital conversion means in said storage means in response to said first horizontal synchronizing signal and said vertical synchronizing signal, and read control means for reading said digital signal from said storage means while skipping digital signal components of said prescribed number of horizontal scanning lines in said vertical blanking interval in response to said second horizontal synchronizing signal and said vertical synchronizing signal.

4. A horizontal deflection circuit comprising:

input means for inputting a video signal;

video signal conversion means for reducing the number of horizontal scanning lines in an effective picture area of a vertical scanning interval by vertical interpolation in said video signal input by said input means and assigning a time corresponding to the reduced number of horizontal scanning lines to horizontal blanking intervals of the remaining horizontal scanning lines thereby extending the horizontal blanking interval of each horizontal scanning line; and horizontal deflection current supply means for supplying a horizontal deflection current to a horizontal deflection coil for retracing an electron beam in each horizontal blanking interval extended by said video signal conversion means.

5. The horizontal deflection circuit according to claim 4, wherein said input means includes analog-to-digital conversion means for performing analog-to-digital conversion on said video signal and outputting a digital signal, and said video signal conversion means includes:

vertical interpolation means for performing vertical interpolation on said digital signal output from said analog-to-digital conversion means thereby reducing the number of horizontal scanning lines in said effective picture area of said vertical scanning interval, storage means for storing said digital signal output from said vertical interpolation means, control means for controlling writing and reading of said digital signal in and from said storage means thereby extending the horizontal blanking period of each horizontal scanning line, and digital-to-analog conversion means for performing digital-to-analog conversion on said digital signal read from said storage means and outputting an analog signal.

6. The horizontal deflection circuit according to claim 5, wherein said control means includes:

first synchronizing signal generation means for generating a vertical synchronizing signal and a first horizontal synchronizing signal, second synchronizing signal generation means for generating a second horizontal synchronizing signal having a lower frequency than said first horizontal synchronizing signal in response to said first horizontal synchronizing signal generated by said first synchronizing signal generation means, write control means for writing said digital signal output from said analog-to-digital conversion means in said storage means in response to said first horizontal synchronizing signal and said vertical synchronizing signal, and read control means for reading said digital signal from said storage means in response to said second horizontal synchronizing signal and said vertical synchronizing signal.

7. A horizontal deflection circuit comprising:

an input circuit inputting a video signal;

a video signal conversion circuit deleting a prescribed number of horizontal scanning lines from a vertical blanking interval in said video signal input by said input circuit and assigning a time corresponding to the deleted horizontal scanning lines to horizontal blanking intervals of the remaining horizontal scanning lines thereby extending the horizontal blanking interval of each horizontal scanning line; and a horizontal deflection current supply circuit supplying a horizontal deflection current to a horizontal deflection coil for retracing an electron beam in each horizontal blanking interval extended by said video signal conversion circuit.

8. The horizontal deflection circuit according to claim 7, wherein said input circuit includes an analog-to-digital converter performing analog-to-digital conversion on said video signal and outputting a digital signal, and said video signal conversion circuit includes:

a memory storing said digital signal output from said analog-to-digital converter, a control circuit controlling writing and reading of said digital signal in and from said memory thereby deleting said prescribed number of horizontal scanning lines from said vertical blanking interval and extending the horizontal blanking interval of each horizontal scanning line, and a digital-to-analog converter performing digital-to-analog conversion on said digital signal read from said memory and outputting an analog signal.

9. The horizontal deflection circuit according to claim 8, wherein said control circuit includes:

a first synchronizing signal generation circuit generating a vertical synchronizing signal and a first horizontal synchronizing signal, a second synchronizing signal generation circuit generating a second horizontal synchronizing signal having a lower frequency than said first horizontal synchronizing signal in response to said first horizontal synchronizing signal generated by said first synchronizing signal generation circuit, a write control circuit writing said digital signal output from said analog-to-digital converter in said memory in response to said first horizontal synchronizing signal and said vertical synchronizing signal, and a read control circuit reading said digital signal from said memory while skipping digital signal components of said prescribed number of horizontal scanning lines in said vertical blanking interval in response to said second horizontal synchronizing signal and said vertical synchronizing signal.

10. A horizontal deflection circuit comprising:

an input circuit inputting a video signal;

a video signal conversion circuit reducing the number of horizontal scanning lines in an effective picture area of a vertical scanning interval by vertical interpolation in said video signal input by said input circuit and assigning a time corresponding to the reduced number of horizontal scanning lines to horizontal blanking intervals of the remaining horizontal scanning lines thereby extending the horizontal blanking interval of each horizontal scanning line; and a horizontal deflection current supply circuit supplying a horizontal deflection current to a horizontal deflection coil for retracing an electron beam in each horizontal blanking interval extended by said video signal conversion circuit.

11. The horizontal deflection circuit according to claim 10, wherein said input circuit includes an analog-to-digital converter performing analog-to-digital conversion on said video signal and outputting a digital signal, and said video signal conversion circuit includes:
    a vertical interpolation circuit performing vertical interpolation on said digital signal output from said analog-to-digital converter thereby reducing the number of horizontal scanning lines in said effective picture area of said vertical scanning interval,
    a memory storing said digital signal output from said vertical interpolation circuit,
    a control circuit controlling writing and reading of said digital signal in and from said memory thereby extending the horizontal blanking interval of each horizontal scanning line, and
    a digital-to-analog converter performing digital-to-analog conversion on said digital signal read from said memory and outputting an analog signal.

12. The horizontal deflection circuit according to claim 11, wherein said control circuit includes:
    a first synchronizing signal generation circuit generating a vertical synchronizing signal and a first horizontal synchronizing signal,
    a second synchronizing signal generation circuit generating a second horizontal synchronizing signal having a lower frequency than said first horizontal synchronizing signal in response to said first horizontal synchronizing signal generated by said first synchronizing signal generation circuit,
    a write control circuit writing said digital signal output from said analog-to-digital converter in said memory in response to said first horizontal synchronizing signal and said vertical synchronizing signal, and
    a read control circuit reading said digital signal from said memory in response to said second horizontal synchronizing signal and said vertical synchronizing signal.

13. A television receiver comprising:

input means for inputting a video signal;

video signal conversion means for deleting a prescribed number of horizontal scanning lines from a vertical blanking interval in said video signal input by said input means and assigning a time corresponding to the deleted horizontal scanning lines to horizontal blanking intervals of the remaining horizontal scanning lines thereby extending the horizontal blanking interval of each horizontal scanning line;

video signal processing means for extracting video information, a horizontal synchronizing signal and a vertical synchronizing signal from said video signal output by said video signal conversion means;

a cathode ray tube having a horizontal deflection coil and a vertical deflection coil for scanning an electron beam with said horizontal deflection coil and said vertical deflection coil and displaying an image in response to said video information output from said video signal processing means;

horizontal deflection current supply means for supplying a horizontal deflection current to said horizontal deflection coil of said cathode ray tube in synchronization with said horizontal synchronizing signal output from said video signal processing means; and vertical deflection current supply means for supplying a vertical deflection current to said vertical deflection coil of said cathode ray tube in synchronization with said horizontal synchronizing signal and said vertical synchronizing signal output from said video signal processing means.

14. The television receiver according to claim 13, wherein said input means includes analog-to-digital conversion means for performing analog-to-digital conversion on said video signal and outputting a digital signal, and said video signal conversion means includes:
    storage means for storing said digital signal output from said analog-to-digital conversion means,
    control means for controlling writing and reading of said digital signal in and from said storage means thereby deleting said prescribed number of horizontal scanning lines from said vertical blanking interval and extending the horizontal blanking interval of each horizontal scanning line, and
    digital-to-analog conversion means for performing digital-to-analog conversion on said digital signal read from said storage means and outputting an analog signal.

15. A television receiver comprising:

input means for inputting a video signal;

video signal conversion means for reducing the number of horizontal scanning lines in an effective picture area of a vertical scanning interval by vertical interpolation in said video signal input by said input means and assigning a time corresponding to the reduced number of horizontal scanning lines to horizontal blanking intervals of the remaining horizontal scanning lines thereby extending the horizontal blanking interval of each horizontal scanning line;

video signal processing means for extracting video information, a horizontal synchronizing signal and a vertical synchronizing signal from said video signal output by said video signal conversion means;

a cathode ray tube having a horizontal deflection coil and a vertical deflection coil for scanning an electron beam with said horizontal deflection coil and said vertical deflection coil and displaying an image in response to said video information output from said video signal processing means;

horizontal deflection current supply means for supplying a horizontal deflection current to said horizontal deflection coil of said cathode ray tube in synchronization with said horizontal synchronizing signal output from said video signal processing means; and vertical deflection current supply means for supplying a vertical deflection current to said vertical deflection coil of said cathode ray tube in synchronization with said horizontal synchronizing signal and said vertical synchronizing signal output from said video signal processing means.

16. The television receiver according to claim 15, wherein said input means includes analog-to-digital conversion means for performing analog-to-digital conversion on said video signal and outputting a digital signal, and said video signal conversion means includes:
- vertical interpolation means for performing vertical interpolation on said digital signal output from said analog-to-digital conversion means thereby reducing the number of horizontal scanning lines in said effective picture area of said vertical scanning interval,
- storage means for storing said digital signal output from said vertical interpolation means,
- control means for controlling writing and reading of said digital signal in and from said storage means thereby extending the horizontal blanking interval of each horizontal scanning line, and
- digital-to-analog conversion means for performing digital-to-analog conversion on said digital signal read from said storage means and outputting an analog signal.

17. A television receiver comprising:

an input circuit inputting a video signal;

a video signal conversion circuit deleting a prescribed number of horizontal scanning lines from a vertical blanking interval in said video signal input by said input circuit and assigning a time corresponding to the deleted horizontal scanning lines to horizontal blanking intervals of the remaining horizontal scanning lines thereby extending the horizontal blanking interval of each horizontal scanning line;

a video signal processing circuit extracting video information, a horizontal synchronizing signal and a vertical synchronizing signal from said video signal output by said video signal conversion circuit;

a cathode ray tube having a horizontal deflection coil and a vertical deflection coil for scanning an electron beam with said horizontal deflection coil and said vertical deflection coil and displaying an image in response to said video information output from said video signal processing circuit;

a horizontal deflection current supply circuit supplying a horizontal deflection current to said horizontal deflection coil of said cathode ray tube in synchronization with said horizontal synchronizing signal output from said video signal processing circuit; and a vertical deflection current supply circuit supplying a vertical deflection current to said vertical deflection coil of said cathode ray tube in synchronization with said horizontal synchronizing signal and said vertical synchronizing signal output from said video signal processing circuit.

18. The television receiver according to claim 17, wherein said input circuit includes an analog-to-digital converter performing analog-to-digital conversion on said video signal and outputting a digital signal, and said video signal conversion circuit includes:
- a memory storing said digital signal output from said analog-to-digital converter,
- a control circuit controlling writing and reading of said digital signal in and from said memory thereby deleting said prescribed number of horizontal scanning lines from said vertical blanking interval and extending the horizontal blanking interval of each horizontal scanning line, and
- a digital-to-analog converter performing digital-to-analog conversion on said digital signal read from said memory and outputting an analog signal.

19. A television receiver comprising:

an input circuit inputting a video signal;

a video signal conversion circuit reducing the number of horizontal scanning lines in an effective picture area of a vertical scanning interval by vertical interpolation in said video signal input by said input circuit and assigning a time corresponding to the reduced number of horizontal scanning lines to horizontal blanking intervals of the remaining horizontal scanning lines thereby extending the horizontal blanking interval of each horizontal scanning line;

a video signal processing circuit extracting video information, a horizontal synchronizing signal and a vertical synchronizing signal from said video signal output by said video signal conversion circuit;

a cathode ray tube having a horizontal deflection coil and a vertical deflection coil for scanning an electron beam with said horizontal deflection coil and said vertical deflection coil and displaying an image in response to said video information output from said video signal processing circuit;

a horizontal deflection current supply circuit supplying a horizontal deflection current to said horizontal deflection coil of said cathode ray tube in synchronization with said horizontal synchronizing signal output from said video signal processing circuit; and a vertical deflection current supply circuit supplying a vertical deflection current to said vertical deflection coil of said cathode ray tube in synchronization with said horizontal synchronizing signal and said vertical synchronizing signal output from said video signal processing circuit.

20. The television receiver according to claim 19, wherein said input circuit includes an analog-to-digital converter performing analog-to-digital conversion on said video signal and outputting a digital signal, and said video signal conversion circuit includes:
- a vertical interpolation circuit performing vertical interpolation on said digital signal output from said analog-to-digital converter thereby reducing the number of horizontal scanning lines in said effective picture area of said vertical scanning interval,
- a memory storing said digital signal output from said vertical interpolation circuit,
- a control circuit controlling writing and reading of said digital signal in and from said memory thereby extending the horizontal blanking interval of each horizontal scanning line, and
- a digital-to-analog converter performing digital-to-analog conversion on said digital signal read from said memory and outputting an analog signal.

* * * * *